United States Patent [19]
Iwata

[11] Patent Number: 5,424,522
[45] Date of Patent: Jun. 13, 1995

[54] CARD CONVEY DEVICE AND METHOD THEREFOR

[75] Inventor: Mitsuru Iwata, Tokyo, Japan

[73] Assignee: Tamura Electric Works, Ltd., Tokyo, Japan

[21] Appl. No.: 264,597

[22] Filed: Jun. 23, 1994

[30] Foreign Application Priority Data

Jun. 25, 1993 [JP] Japan .................................. 5-177587

[51] Int. Cl.[6] ...................... G06C 11/08; G06F 15/12
[52] U.S. Cl. ..................................... 235/434; 235/437
[58] Field of Search ................................. 235/434, 437

[56] References Cited

U.S. PATENT DOCUMENTS 5,019,695  5/1991  Itako ................................. 235/434

Primary Examiner—Harold Pitts
Attorney, Agent, or Firm—Blakely, Sokoloff, Taylor & Zafman

[57] ABSTRACT

A card convey device includes a card convey unit, a punching unit, a counting unit, and a control unit. The card convey unit selectively conveys a card in a discharging direction and an opposite direction thereto. The punching unit punches the card which slows down, while the card is conveyed by the card convey unit in the discharging direction. The counting unit is enabled after a punching operation is performed by the punching unit, and counts the number of times of repetition of a reciprocal card convey operation in the opposite direction and the discharging direction. The control unit controls a convey operation of the card convey unit and repeatedly reciprocally conveys the card in the opposite direction and the discharging direction until the count value of the enabled counting unit reaches a predetermined count value. When the count value of the counting unit reaches the predetermined count value, the control unit conveys the card in the discharging direction and discharges the card.

6 Claims, 5 Drawing Sheets

CARD CONVEY DEVICE AND METHOD THEREFOR

BACKGROUND OF THE INVENTION

The present invention relates to a card convey device and a method therefor, for conveying a card while the card is used and, more particularly, to a card convey device and a method therefor, for performing a punching process to a card in accordance with value information left on the card and discharging the card.

On a pre-paid card (to be referred to as only a card hereinafter) used in a public telephone system or the like, value information corresponding to a pre-paid amount is stored in advance. In this case, when a card is inserted into a public telephone set to perform speech communication using the card, the inserted card is conveyed to the position of a reading head, and the value information is read. If the read value information has a value larger than a predetermined value, speech communication is permitted. When the speech communication is performed in a predetermined procedure, and the speech communication is finished, value information corresponding to a speech communication time is subtracted from the read value information, and the resultant value information is recorded on the card as remaining value information by a writing head. Thereafter, this card is conveyed to the position of a punching unit for a punching process, and this punching unit performs a punching process at a position corresponding to the remaining value information using a punching pin. The card is conveyed to a discharging port and discharged.

FIG. 5 illustrates the condition of a punching process performed to a card 101. The punching unit 124 comprises a punching pin 124a for punching the card 101, a solenoid 124b for driving the punching pin 124a, and a spring 124c for restoring the punching pin 124a driven by the solenoid 124b to an initial position. Before the card 101 is punched using the punching unit 124 arranged as described above, a motor for conveying the card 101 is rotated in the reverse direction to brake the card 101 which is in a convey state. The punching unit 124 is driven to punch, at a predetermined punch position, the card 101 which is almost stopped, or slightly conveyed due to the inertial force thereof. However, when the card 101 is braked, the pressure from a punched hole 101a formed in the card 101 acts on the punching pin 124a as a side pressure due to the inertial force of the card. As a result, the punching pin 124a is caught by the card 101 against the restoring force of the spring 124c, so that the punching pin 124a cannot return to the initial position. When this trouble occurs, a deformed portion 101b is formed in the punched hole 101a of the card 101 by the side pressure from the punching pin 124a, and a problem that a card is jammed in the card convey path is posed.

SUMMARY OF THE INVENTION

It is an object of the present invention to provide a card convey device and a method therefor, for reliably discharging a punched card to prevent a card from being jammed in a card convey path.

In order to achieve the above object, according to the present invention, there is provided a card convey device comprising card convey means for selectively conveying a card in a discharging direction and an opposite direction thereto, punching means for punching the card which slows down, while the card is conveyed by the card convey means in the discharging direction, counting means, enabled after a punching operation is performed by the punching means, for counting the number of times of repetition of a reciprocal card convey operation in the opposite direction and the discharging direction, and control means for controlling a convey operation of the card convey means, repeatedly reciprocally conveying the card in the opposite direction and the discharging direction until the count value of the enabled counting means reaches a predetermined count value, and, when the count value of the counting means reaches the predetermined count value, conveying the card in the discharging direction and discharging the card.

DESCRIPTION OF THE PREFERRED EMBODIMENT

The present invention will be described below with reference to the accompanying drawings.

Figure 1:
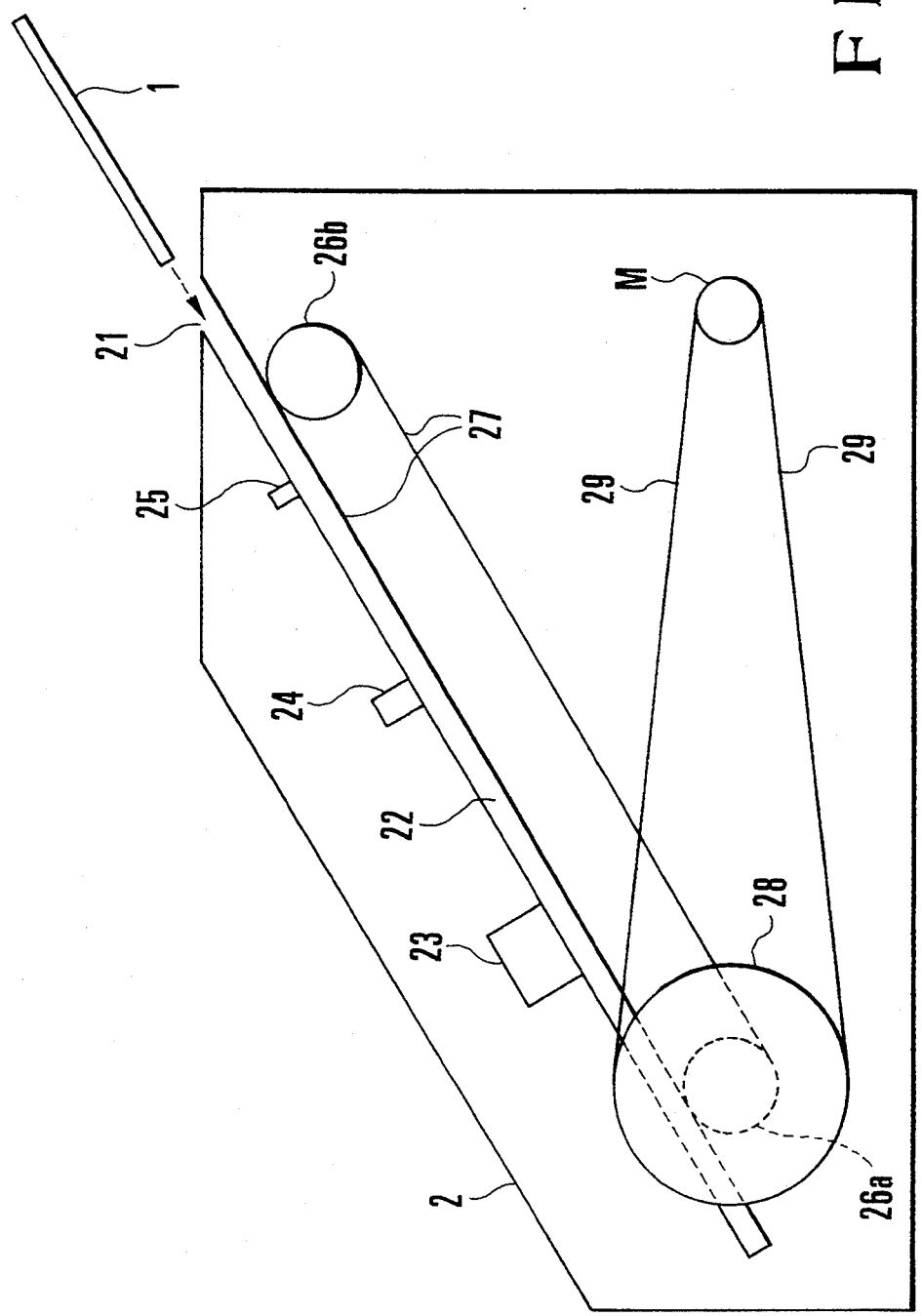
FIG. 1 is a schematic sectional view showing an embodiment of a card reader/writer apparatus to which a card convey device according to the present invention is applied.

FIG. 1 shows a card reader/writer apparatus to which a card convey device according to the present invention is applied. Referring to FIG. 1, reference numeral 1 denotes a pre-paid card (to be referred to as a card hereinafter) on which value information corresponding to a pre-paid amount is magnetically recorded; and 2, a card reader/writer apparatus for magnetically recording/reproducing the value information on/from the card 1 and punching the card 1.

Figure 5:
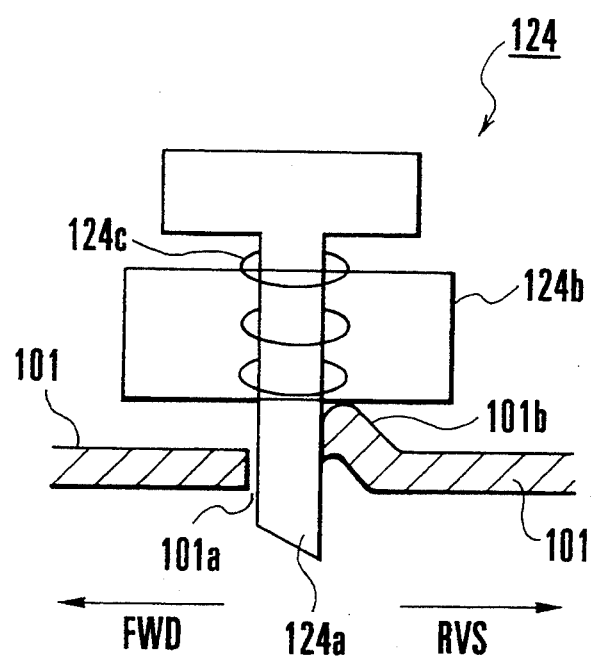
FIG. 5 is a view for explaining the state of the card obtained after the punching operation is performed.

The card reader/writer apparatus 2 is constituted as follows. Reference numeral 21 denotes an insertion/discharging port for inserting or discharging the card 1; 22, a card convey path communicating with the insertion/discharging port 21; 23, a magnetic head which is arranged on the card convey path 22 and magnetically records/reproduces value information on/from the card 1; 24, a punching unit 24 which has the same arrangement as that in FIG. 5 and performs, to the card 1, a punching operation for indicating remaining or invalid value information by a punch position; and 25, a position sensor for detecting the position of the card 1 on the card convey path 22. Reference numerals 26a and 26b denote rollers; 27, a belt looped between the rollers 26a and 26b to form the card convey path 22; and 28, a pulley coaxial with the roller 26a. Reference symbol M denotes a motor for driving the rollers 26a and 26b. Reference numeral 29 denotes a belt looped between the motor M and the pulley 28. In this case, when the motor M is rotated, the rotational force is transmitted to the pulley 28 through the belt 29 to rotate the pulley 28. The rollers 26a and 26b are rotated together with the rotation of the pulley 28, and the card 1 on the belt 27 is conveyed on the card convey path 22.

Figure 2:
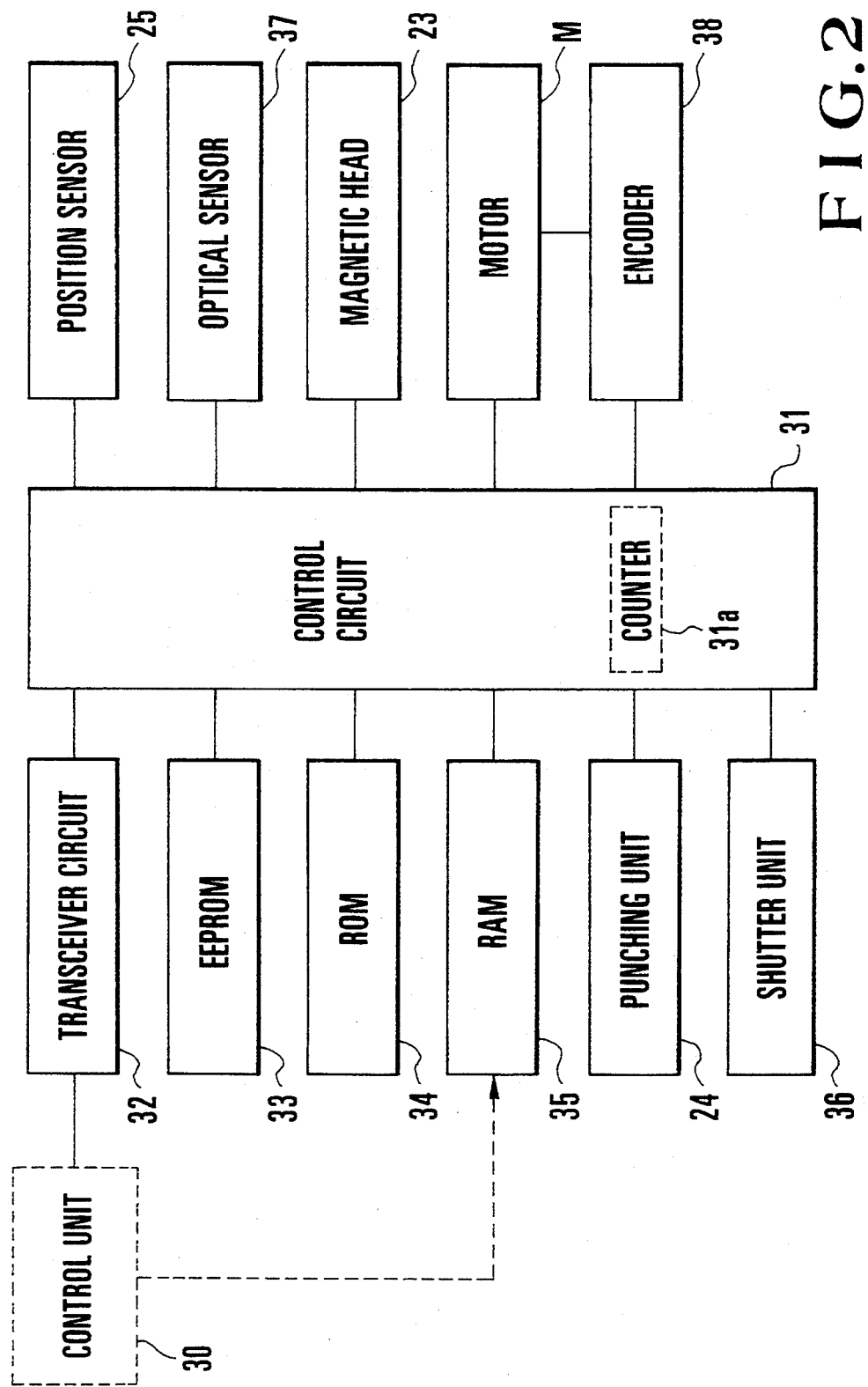
FIG. 2 is a block diagram showing an example of the card reader/writer apparatus in FIG. 1.

FIG. 2 shows the control system of the card reader/writer apparatus 2. A control circuit 31 constituted by a CPU (Central Processing Unit) for controlling this apparatus is connected to a control unit 30 for controlling a host apparatus, e.g., a public telephone set, through a transceiver circuit 32. The magnetic head 23, the punching unit 24, the position sensor 25, and the motor M which are shown in FIG. 1 are connected to the control circuit 31 having a counter 31a. In addition, an EEPROM (Electrically Erasable Programmable Read Only Memory) 33, a ROM 34 (Read Only Memory) for storing a program which is executed by the control circuit 31, a RAM (Random Access Memory) 35 in which the contents of the control unit 30 are stored and held by a backup power supply from the control unit 30, a shutter unit 36 for a switching operation for the card convey path 22, an optical sensor 37 for detecting an illegal prevention bar code added to the card 1 in advance, and an encoder 38 used for detecting the rotational speed of the motor M, i.e., the convey speed of the card 1 or a position thereof, are connected to the control circuit 31.

On the other hand, when the card 1 is inserted into the insertion/discharging port 21 shown in FIG. 1, the position sensor 25 detects the card 1, and the control circuit 31 which receives a detection output from the position sensor 25 rotates the motor M to rotate the pulley 28 and the roller 26a interlocked therewith. Therefore, the roller 26b connected to the roller 26a through the belt 27 is rotated, and the inserted card 1 is conveyed to the position of the magnetic head 23 along the card convey path 22 by the belt 27.

Thereafter, the control circuit 31 causes the magnetic head 23 to read the value information magnetically recorded on the card 1. For example, during speech communication, predetermined value information corresponding to a speech communication time is subtracted from the read value information each time the control circuit 31 receives a charging signal from a station switching unit. Upon completion of the speech communication, the control circuit 31 controls the magnetic head 23 to magnetically record the remaining value information on the card 1. Thereafter, the control circuit 31 rotates the motor M to convey the card 1 toward the insertion/discharging port 21, thereby rotating the pulley 28 and the rollers 26a and 26b in the discharging direction. In this manner, the card 1 is conveyed from the position of the magnetic head 23 to the position of the punching unit 24. At this time, the control circuit 31 drives the punching unit 24 to punch the card 1 which slows down, at a punching position corresponding to the remaining value information of the card 1 while the card 1 is conveyed. Note that this punching position serves as an index indicating the remaining value information. Upon completion of the punching process for the card 1, an output from the position sensor 25 for detecting the position of the card 1 is monitored to detect the presence of the card 1, thereby conveying the card 1 to the insertion/discharging port 21 to discharge it.

In the card reader/writer apparatus 2 arranged described above, a trouble that the punching pin of the punching unit 24 cannot return to the initial position may occur as described above. For this reason, according to the device of this embodiment, when the discharging direction of the card 1 is set to coincide with the forward rotational direction (FWD) of the motor M, a punching operation is performed to the card 1. Upon completion of the punching operation, the motor M is rotated in the reverse direction (RVS), and then rotated in the forward direction. These operations are repeated several times, and the card 1 is reliably discharged from the card convey path 22.

Figure 3:
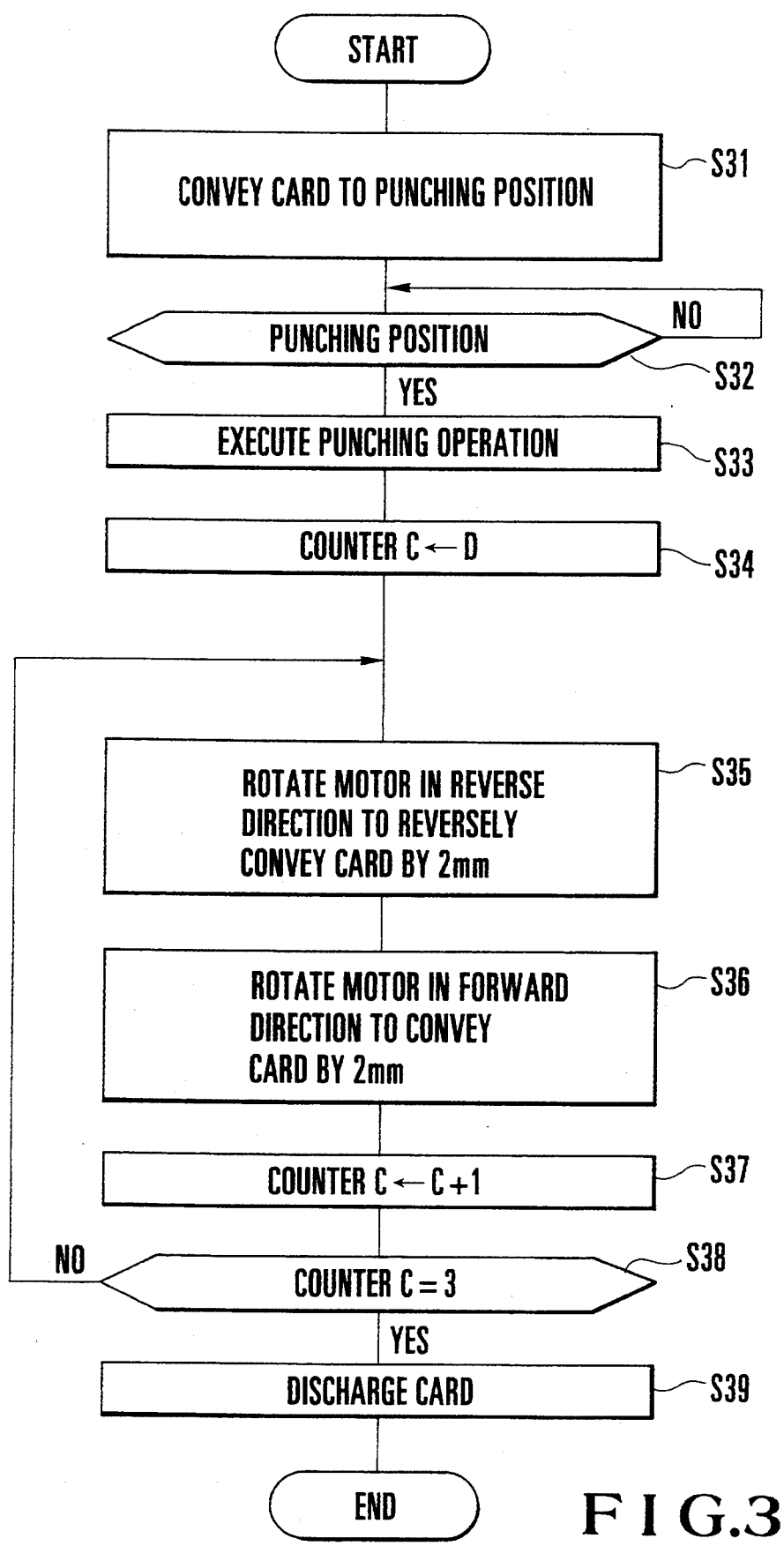
FIG. 3 is a flow chart for explaining the punching operation and card convey operation of the card reader/writer apparatus in FIG. 1.
Figure 4:
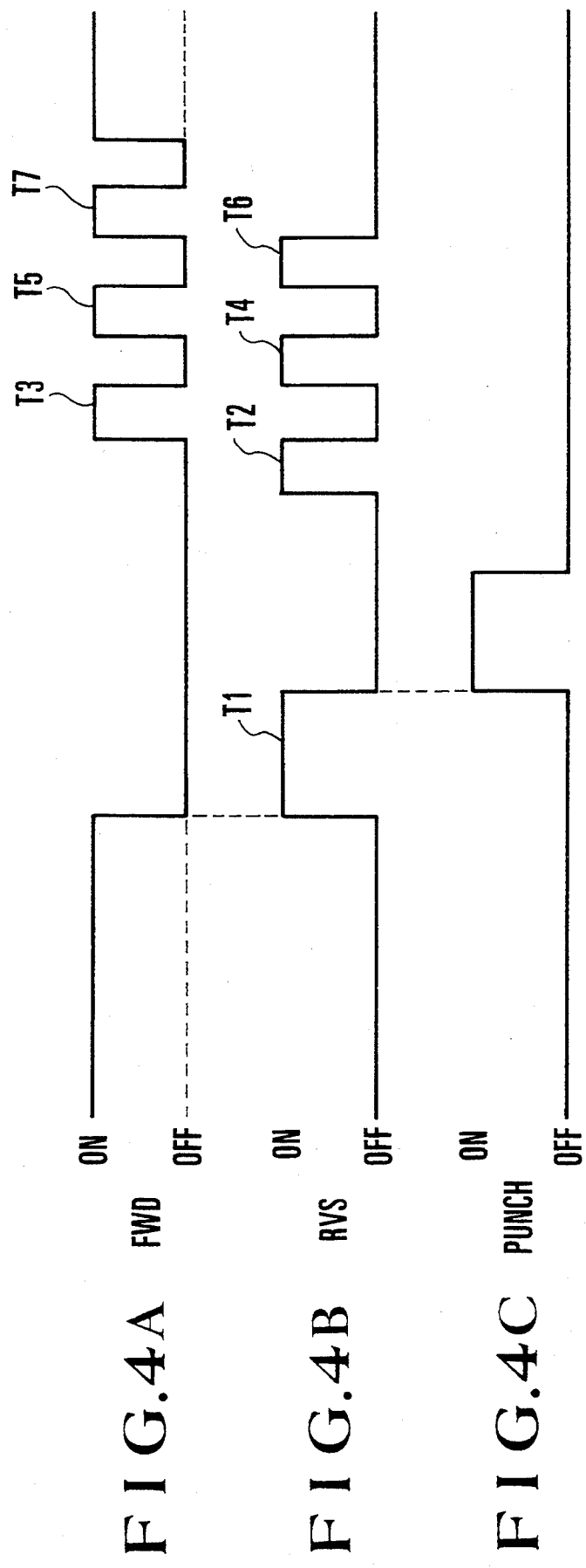
FIGS. 4A to 4C are timing charts for explaining the punching operation and card convey operation of the card reader/writer apparatus in FIG. 1.

FIG. 3 shows the flow chart of the punching operation and card convey operation of the device of this embodiment, FIG. 4 shows the timing chart thereof, and shows an operation performed after the punching operation for the card 1. After a process of recording value information on the card 1 inserted from the insertion/discharging port 21 into the card convey path 22 is performed, the motor M is rotated in the forward direction to convey the processed card 1 in the direction toward the punching unit 24 in step S31. In this case, when the card 1 is conveyed to a position near the punching unit 24, as shown in a period T1 of FIG. 4B, the control circuit 31 rotates the motor M in the reverse direction to brake the card 1. After braking the card 1 is conveyed at a little speed for a predetermined distance due to the inertial force thereof. It is checked in step S32 by an output from an encoder 38 or the like whether the card 1 is conveyed to a predetermined punching position.

When the card 1 is conveyed to the punching position, if "YES" in step S32, as shown in FIG. 4, the control circuit 31 drives the punching unit 24 in step S33 to cause the punching unit 24 to execute a punching operation for the card 1. Upon completion of the punching operation, the control circuit 31 sets the value of the counter 31 constituted by an internal register or the like to be "0" in step S34. The motor M is rotated in the reverse direction in step S35, and as shown in a period T2 of FIG. 4B, the magnetic card 1 is reversely conveyed by, e.g., 2 mm in the direction opposite to the discharging direction of the card 1. Thereafter, the motor M is rotated in the forward direction, i.e., the discharging direction of the card 1, in step S36, and, as shown in a period T3 of FIG. 4A, the card 1 is conveyed by, e.g., 2 mm, in the forward direction. The value of the counter 31a is incremented by one in step S37. The flow advances to step S38 to check whether the value of the counter C becomes "3". When the value of the counter 31a is smaller than "3", as shown in periods T4 to T7 of FIGS. 4A and 4B, a card reverse convey operation in step S35 and a card forward convey operation in step S36 are repeated. When the value of the counter 31a becomes "3", the flow advances to step S39 to discharge the card 1.

The control circuit 31 performs each of the card reverse convey operation in step S35 and the card forward convey operation in step S36 three times such that the punching pin is reliably removed from the card 1 by the restoring force of the spring after the card 1 is punched by the punching pin of the punching unit 24. Thereafter, the control circuit 31 controls the card 1 to discharge it to the insertion/discharging port 21. Note that not only the punching pin is restored to the initial state by the spring, but also the punching pin may be forcibly restored to the initial state by driving a removing solenoid. As a result, the punched card 1 can be reliably discharged to the insertion/discharging port 21.

As has been described above, according to the present invention, after a punching process is performed to a card, a convey operation in which the card is reversely conveyed to a predetermined position in the direction opposite to a card discharging direction and the reversely conveyed card to the predetermined position in the card discharging direction is repeated a predetermined number of times, thereby discharging the card. For this reason, the punched card can be reliably discharged to a discharging port, and the card can be prevented from being jammed in a card convey path.

What is claimed is:

1. A card convey device comprising:
   card convey means for selectively conveying a card in a discharging direction and an opposite direction thereto;
   punching means for punching the card which slows down, while the card is conveyed by said card convey means in the discharging direction;
   counting means, enabled after a punching operation is performed by said punching means, for counting the number of times of repetition of a reciprocal card convey operation in the opposite direction and the discharging direction; and
   control means for controlling a convey operation of said card convey means, repeatedly reciprocally conveying the card in the opposite direction and the discharging direction until the count value of said enabled counting means reaches a predetermined count value, and, when the count value of said counting means reaches the predetermined count value, conveying the card in the discharging direction and discharging the card.

2. A device according to claim 1, wherein said card convey means performs a convey operation in the opposite direction and then performs a convey operation in the discharging direction to reciprocally convey the card.

3. A device according to claim 1, wherein said card convey means performs a reciprocal convey operation to convey the card by the same distance in the opposite direction and the discharging direction.

4. A device according to claim 1, wherein while the card is conveyed in the discharging direction, said convey means switches the card convey operation to the convey operation in the opposite direction to brake the card, and said punching means punches, at a predetermined position, the braked card.

5. A device according to claim 1, wherein said punching means comprises a punching pin for punching the card, driving means for driving said punching pin in a punching direction, and a spring for restoring said driven punching pin to an initial position, so that when said punching pin is kept in an operated state by a side pressure in a convey direction of the card while said punching pin performs a punching operation, the side pressure of the card is released by a reciprocal convey operation of said card convey means to restore said punching pin to an initial position.

6. A method of conveying a card, comprising the steps of:
   conveying a card in a discharging direction;
   braking the card while the card is conveyed in the discharging direction;
   punching, at a predetermined position, the card stopped by braking;
   reciprocally conveying the punched card in an opposite direction to the discharging direction and the discharging direction a predetermined number of times; and
   conveying and discharging the card after the card is reciprocally conveyed the predetermined number of times.

* * * * *